(12) United States Patent
Liang et al.

(10) Patent No.: US 8,976,344 B2
(45) Date of Patent: Mar. 10, 2015

(54) LIVE OPTICAL FIBER IDENTIFIER TOOL

(71) Applicant: OFS Fitel, LLC, Norcross, GA (US)

(72) Inventors: Yue Liang, Peachtree City, GA (US); Ryuji Takaoka, Chiba (JP)

(73) Assignee: OFS Fitel, LLC, Norcross, GA (US)

( * ) Notice: Subject to any disclaimer, the term of this patent is extended or adjusted under 35 U.S.C. 154(b) by 186 days.

(21) Appl. No.: 13/863,677

(22) Filed: Apr. 16, 2013

(65) Prior Publication Data
US 2014/0307251 A1    Oct. 16, 2014

(51) Int. Cl.
*G01N 21/00* (2006.01)
*G01M 11/00* (2006.01)

(52) U.S. Cl.
CPC .................................... *G01M 11/33* (2013.01)
USPC ........................................................ 356/73.1

(58) Field of Classification Search
CPC .......... G01M 11/3145; G01M 11/335; G01M 11/33; G01M 11/3109; G01M 11/338
USPC ........................................................ 356/73.1
See application file for complete search history.

(56) References Cited

U.S. PATENT DOCUMENTS

| | | |
|---|---|---|
| 5,138,690 A | 8/1992 | Cox |
| 5,708,499 A | 1/1998 | Baden et al. |
| 2008/0192241 A1 | 8/2008 | He |

OTHER PUBLICATIONS

Furukawa Electric Co., Ltd., Optical Fiber Identifier ID-H/R Instruction Manual (Aug. 2008).
OFS, Fitel Fusion Splicers, Specifications for ID-H/R Fiber Identifier (2008).
Fujikura Ltd., Specifications for FID-25R & 26R Optical Fiber Identifiers (undated).
JDSU, Specifications for FI-60 Live Fiber Identifier (Mar. 2011).
EXFO, Specifications for LFD-300B/TG-300B FiberFinder (2011).

*Primary Examiner* — Abdullahi Nur
*Assistant Examiner* — Md Rahman
(74) *Attorney, Agent, or Firm* — Law Office of Leo Zucker

(57) ABSTRACT

A live fiber identifier tool includes a head portion having a slot. A cable containing a pair of optical fibers can be inserted in the slot and forced to bend inside the head portion when a trigger is operated. Any light signal in a given fiber partially leaks from the fiber and exits the cable bend. Two photo detectors are located so that one of the detectors receives more light from the cable bend than the other detector depending on the signal direction in the given fiber. Processing components coupled to the detectors and the indicator define a threshold factor that corresponds to a determined difference between the outputs of the detectors. If the difference between the detector outputs does not exceed the threshold factor, an indicator on the tool reports that light signals are traveling in the pair of optical fibers in opposite directions along the cable.

14 Claims, 4 Drawing Sheets

LIVE OPTICAL FIBER IDENTIFIER TOOL

BACKGROUND OF THE INVENTION

1. Field of the Invention

The present invention relates to fiber optical measurement tools, and particularly to tools for detecting the presence of light signals in optical fibers or cables.

2. Discussion of the Known Art

So-called live optical fiber identifier tools are generally known. See, e.g., U.S. Pat. No. 5,708,499 (Jan. 13, 1998); and U.S. Patent Appl'n Pub. No. 2008/0192241 (Aug. 14, 2008). FIGS. 1 and 2 of the present application show side and front views of a live fiber identifier tool 1 available from OFS Fitel, LLC, Norcross, Ga. 30071, as model No. ID-H/R.

The known live fiber identifier tools indicate the direction in which a signal is traveling in a single optical fiber within a cable, or in a fiber selected from among a number of ribboned fibers, without disconnecting the cable or otherwise disrupting traffic in an associated network. A length of the cable or fiber is inserted through a slot or groove 2 defined in a fiber detection head portion 3 of the tool 1, as shown in FIGS. 1 and 2. The user then pulls a lever or trigger 4 downward, causing a clamp in the head portion 3 to urge the cable into a darkened recess or chamber inside the head portion, and to force the cable to bend inside the recess by a certain amount. The tool 1 also has a control panel 5 including a power on/off switch 6, signal direction indicator lamps 7, and a tool status and measurement data display screen 8.

Two photo detectors are mounted at determined locations inside the head portion 3 (see FIG. 3 and related description below). A small fraction of any light signal traveling in the cable fiber will leak from the fiber and exit from the cable bend, and the photo detectors are located so that depending on the direction of the light signal in the fiber, one of the detectors receives more of the light that exits the cable than the other detector. Live fiber identifier tools are generally quite effective and often used in fiber optic data centers, FTTx, and related applications.

Optical cables that contain a pair of fibers rather than just a single fiber are also being used more frequently at many data centers. For example, Google® and Bank of America® recently started to deploy dual bend insensitive multimode fiber (BIMF) cables at their main and sub-database centers. With such dual fiber cables, it becomes possible for two different light signals to travel through respective fibers in opposite directions along the same cable, at any given time. The existing live fiber identifier tools operate only indicate the direction a light signal is traveling along a cable containing a single fiber, however. Therefore, in order to operate and maintain modern data centers like those mentioned above, there is a need for a tool capable of indicating the presence and direction of light signals that may travel along a dual fiber cable in just one or in both directions at any given time.

SUMMARY OF THE INVENTION

According to the invention, an optical fiber identifier tool comprises a housing including a head portion having an interior recess, and a trigger arranged on the housing for operating the tool. A slot or groove is formed in the head portion for insertion of a cable that contains a pair of optical fibers. A clamp in the head portion urges the cable into the recess, and forces the cable to bend a certain amount when the trigger is operated so that a light signal traveling in a given one of the fibers partially leaks from the fiber and exits the cable bend.

Two photo detectors are mounted at determined positions inside the head portion, so that one of the detectors receives more of the light from the cable than the other detector depending on the direction of the signal in the given fiber, and each detector produces an output corresponding to the amount of light received by the detector. An indicator on the tool housing is arranged to show the direction of light signals traveling in the cable fibers.

One or more processing components are coupled to the photo detectors and the indicator, and are configured to define a threshold factor that corresponds to a certain difference between the outputs of the photo detectors. If a measured difference between the outputs of the detectors does not exceed the threshold factor, then the indicator reports that light signals are traveling in the pair of optical fibers in opposite directions along the cable.

For a better understanding of the invention, reference is made to the following description taken in conjunction with the accompanying drawing and the appended claims.

DETAILED DESCRIPTION OF THE INVENTION

Figure 1:
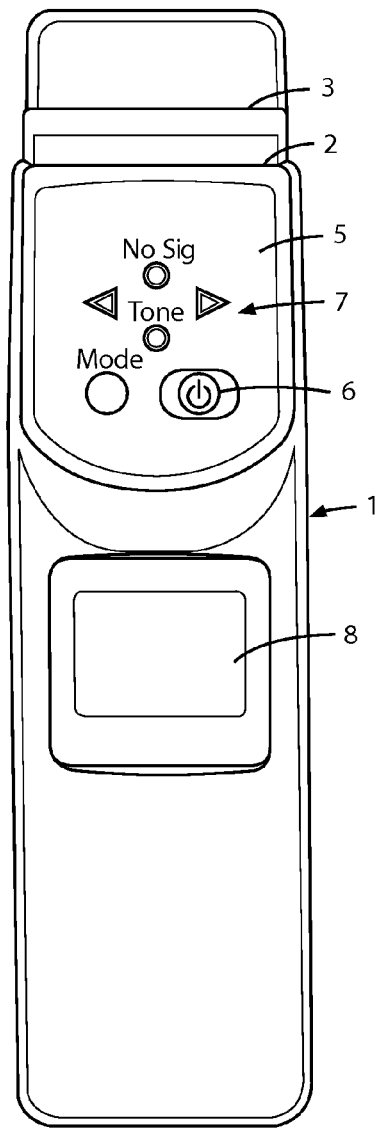
FIG. 1 is side elevation view of an optical fiber identifier tool of the kind in which the present invention can be embodied.
Figure 2:
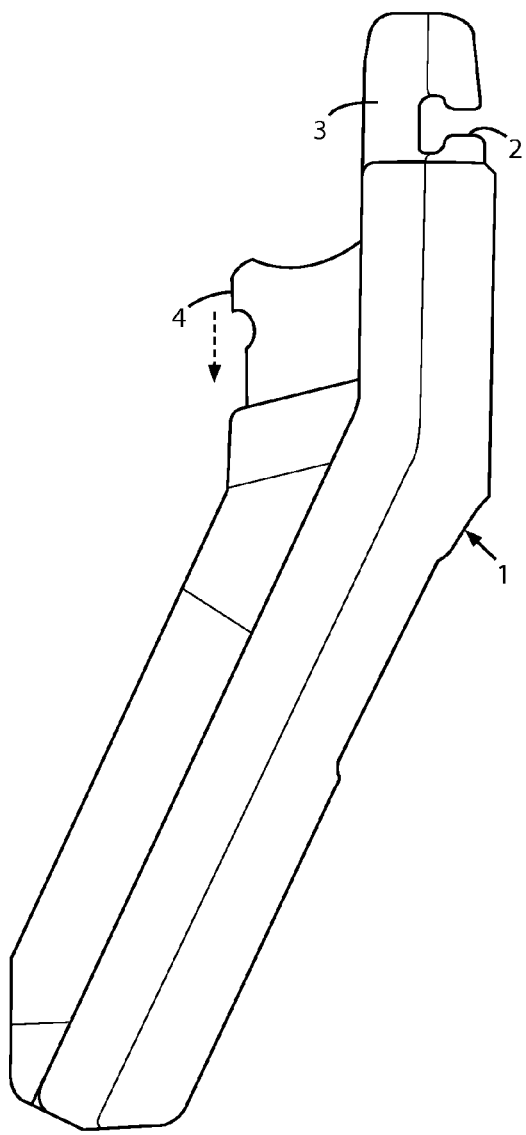
FIG. 2 a front view of the tool in FIG. 1.
Figure 3:
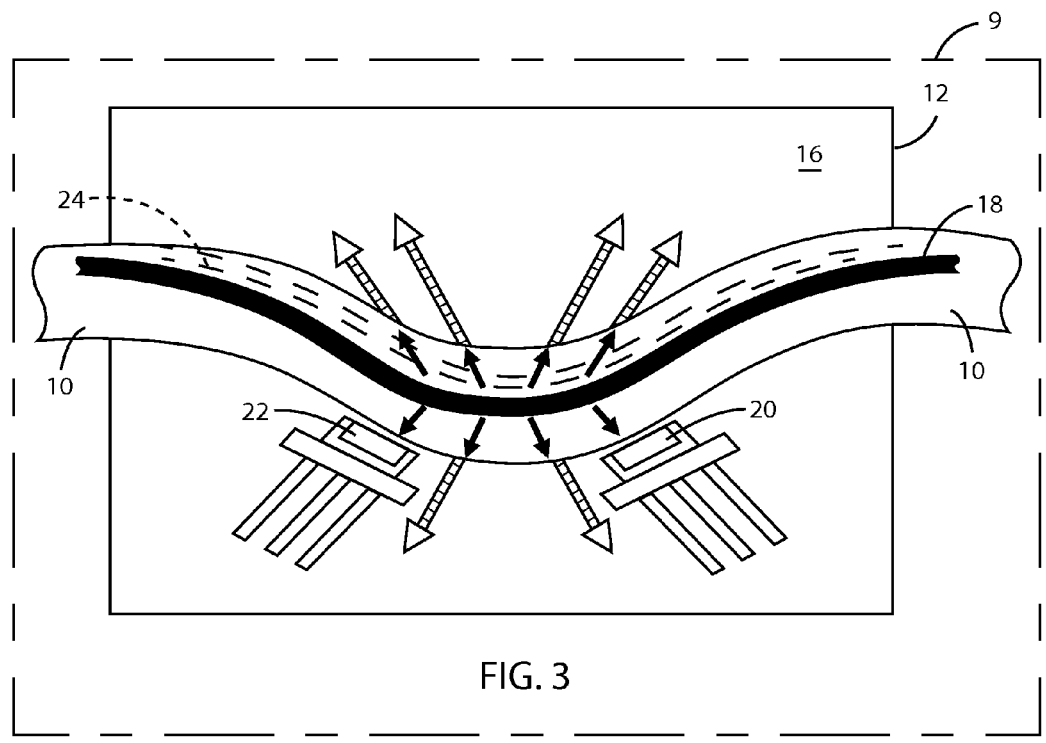
FIG. 3 is graphically illustrates an optical cable inserted in a head portion of the tool, after the cable is urged into a darkened recess in the head portion.

FIG. 3 illustrates the interior of a fiber detection head portion 12 of a live optical fiber identifier tool 9 whose processing components are configured according to the present invention. Other physical components of the tool 9 may be the same or similar to, for example, the fiber identifier tool 1 in FIGS. 1 and 2.

When an optical cable 10 is inserted in a slot in the head portion 12 and the tool trigger is pulled by the user, the inserted length of the cable 10 is urged into a darkened recess or chamber 16 inside the head portion. The cable 10 and an optical fiber 18 in the cable are then forced to bend a certain amount within the recess 16 as shown in FIG. 3. Due to the physical characteristics of optical fibers, a small fraction of any light signal traveling in the fiber 18 will leak out of the fiber and exit the bend region of the cable 10. Two photo detectors 20, 22 are mounted inside the head portion 12 in the vicinity of the recess 16. The detectors are located so that one of the two detectors 20, 22 receives more of the leaked light from the cable bend than the other detector, depending on the direction a light signal travels through the cable fiber 18,.

For example, if a light signal travels through the fiber 18 from the left toward the right as viewed in FIG. 3, the detector 20 receives more of the leaked light and the tool 9 indicates that the direction of signal traffic along the cable 10 is from the left toward the right. On the other hand, if a light signal propagates in the fiber 18 from the right toward the left as viewed in FIG. 3, then the detector 22 catches more of the leaked light and the tool 9 indicates that the direction of signal traffic is from the right toward the left. As mentioned, conventional live fiber identifiers like the tool 1 in FIGS. 1 and 2 accommodate both scenarios for optical cables that contain a single fiber.

If the cable 10 has dual fibers, e.g., the fiber 18 and a second fiber 24 as shown in FIG. 3, then it is possible for two different light signals to travel in opposite directions along the cable 10 through their respective fibers. Thus, a proper indication of the direction of signal traffic along the cable 10, i.e., only right to left, only left to right, or both directions simultaneously, is more difficult to obtain.

Specifically, it will be understood that if the amount of light leaked from the fibers 18, 24 for either signal direction is similar, e.g., within one dB, then the direction of signal traffic as being only left to right, right to left, or in both directions simultaneously, can be determined reliably by the responses of the detectors 20, 22 to the leaked light. Due to the structure of dual fiber cables, and the positions of the cable fibers 18, 24 with respect to the photo detectors 20, 22 when the cable 10 is urged into the recess 16, the amount of light that leaks from the fibers for one signal direction can differ greatly from the amount that leaks from the fibers for the opposite signal direction. Thus, existing live fiber identifier tools may indicate that traffic along the cable 10 is traveling in only one direction, when in fact two signals are traveling in opposite directions through the respective fibers 18, 24.

Figure 5:
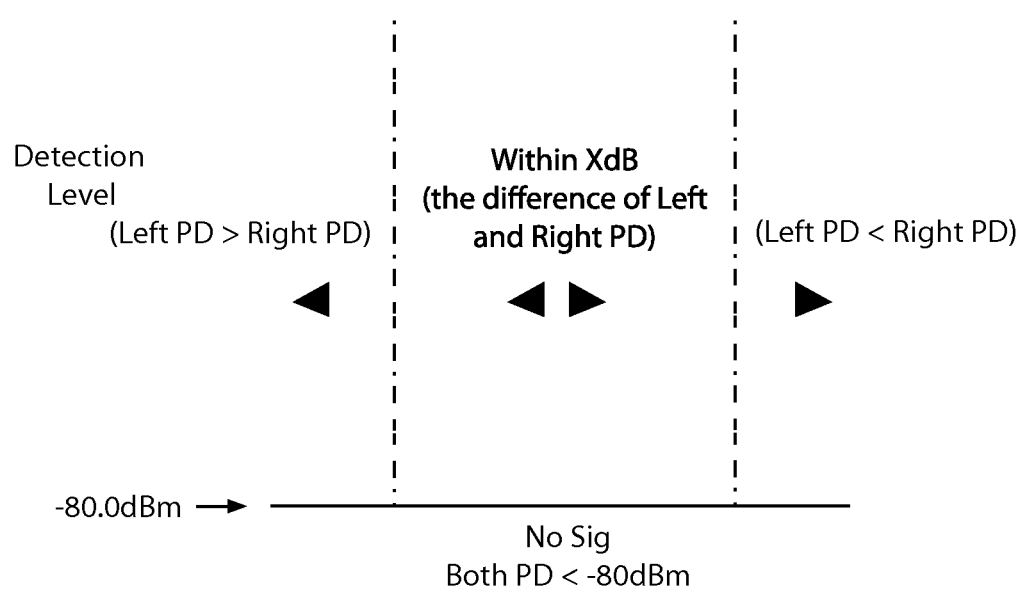
FIG. 5 illustrates the operation of a threshold factor that is defined in the process of FIG. 4, according to the invention.

According to the invention, one or more processing stages or components associated with the tool 9 are configured to enable a threshold factor to be adjusted or set with respect to the responses of the photo detectors 20, 22, as illustrated in FIG. 5. Specifically, the tool 9 operates to indicate the presence of signal traffic in both directions at the time of measurement, whenever the difference between the responses of the photo detectors 20, 22 is within the threshold factor as shown, for example, by the twin arrowheads at the center of FIG. 5. If properly set, the threshold factor allows the tool 9 to indicate reliably that light signals are traveling in opposite directions along a dual fiber cable, notwithstanding a substantial difference in the amount of light that leaks from the fibers depending on the direction of each signal.

Figure 4:
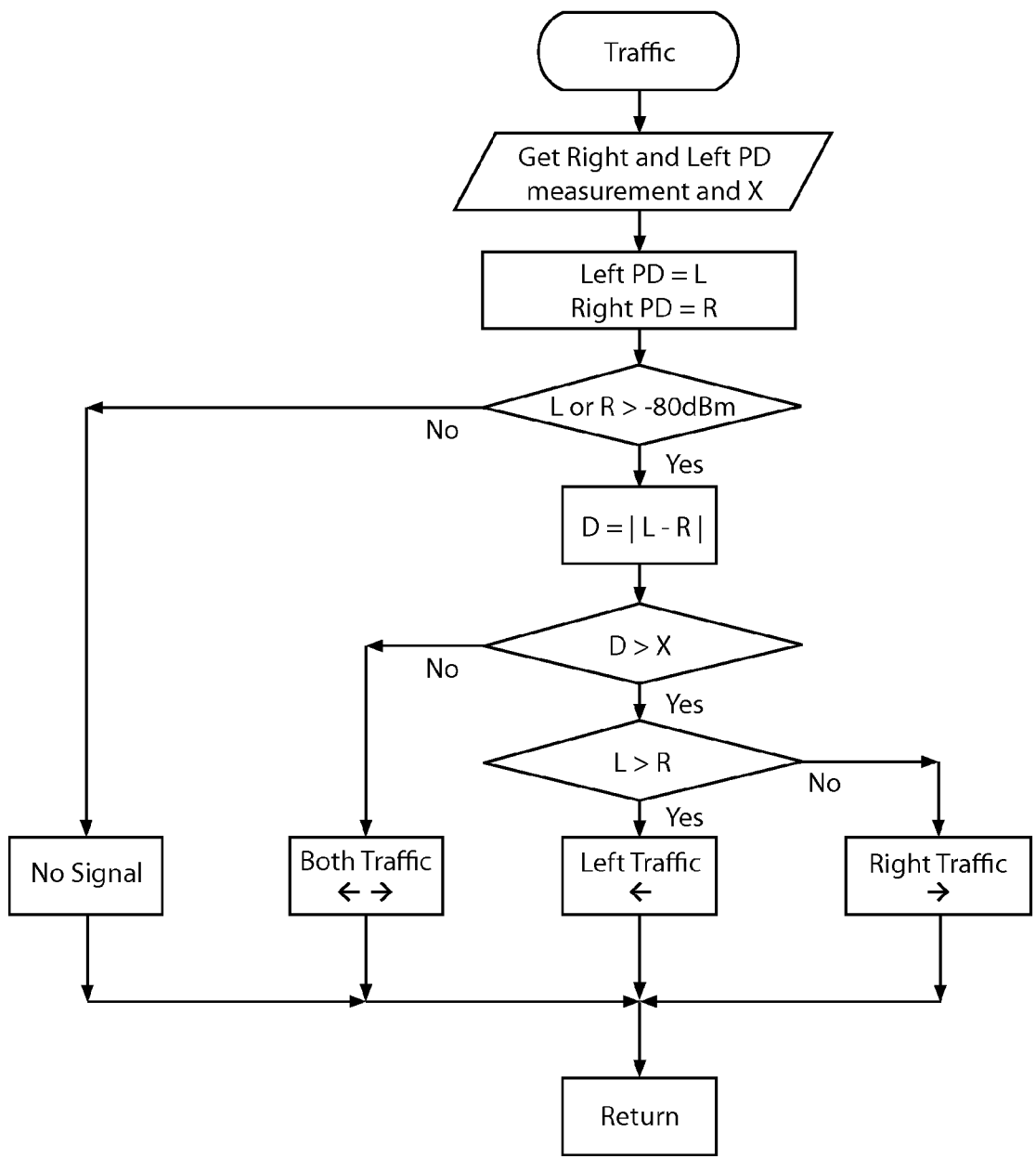
FIG. 4 is a diagram of steps performed by processing components of the tool, to identify the direction of light signals in one or both of a pair of optical fibers in the cable, according to the invention.

FIG. 4 is a flow chart of operations performed by the processing components of the tool 9 in FIG. 3, so that the tool operates to indicate which direction (if any) signal traffic is traveling through the fibers 18, 24 along the cable 10, or to show that traffic is traveling in both directions through the respective fibers when the cable is measured by tool.

In the chart of FIG. 4:

L=power of leaked light detected by left photo detector 22

R=power of leaked light detected by right photo detector 20

D=absolute difference between L and R

X=sensitivity threshold for detection of signal traffic in both directions (adjustable between, e.g., zero and 10 dB)

Assume that the maximum sensitivity for each detector 22, 20 is, e.g., −80 dBm.

Note that in conventional live fiber identifier tools, the value X is fixed and not adjustable. This is why the existing tools do not function properly when used on a dual fiber cable, wherein two light signals may be traveling in opposite directions in respective fibers when the cable is being measured with the tool.

The proper value of the threshold factor X is determined taking the following factors into account:

A. The nature of the fiber, i.e., bend insensitive or not bend insensitive, single mode (SM), or multimode (MM).

B. The cable jacket structure including whether the jacket is flat or round, whether Kevlar or other material is present, and the pattern in which the dual fibers are laid inside the cable.

C. The wavelength of the light source, e.g., 850 nm, 1310 nm, 1550 nm, or other.

The threshold factor X may, for example, be prompted on a display panel of the tool 9, and entered by the user during a set-up routine when the tool is initially powered up. The user then enters a certain value for X, based on the user's existing knowledge, or the results of initial "trial-and-error" usage of the tool with a dual fiber cable. Note that if the sensitivity difference is set too small, the tool 9 may fail to indicate signal traffic in the direction associated with the weaker leakage from the cable fibers. If the difference is set too big, then both of the detectors 20, 22 may respond to the light leaked from the fibers when signal traffic along the cable 10 is in only one direction, and falsely indicate that traffic is present in both directions.

EXAMPLE ONE

A Round Bend Insensitive Dual Fiber Cable with Kevlar Material Surrounding the Fibers For cables with bend insensitive fibers, enough signal leakage can be obtained from the fibers to exit the cable and reach the photo detectors 20, 22, by forming the clamp in the head portion 12 of the tool 9 so that the fibers are forced to bend more sharply than ordinary, non-bend insensitive fibers to be measured with the tool.

In this example, the threshold factor X should be set high, e.g., at 4 or 5 dB.

Factor X Set Too Small

Specifically, if X is set too small, e.g., zero or 1 dB, the following scenarios can happen.

1. In a case where both fibers are "live" with signal traffic in both directions, the tool may not be capable of producing consistent results since both fibers are bend insensitive (meaning the fibers are not susceptible to signal leakage), and the cable structure (Kevlar material and/or fiber lay pattern) may also prevent one fiber from bending more severely than the other fiber. As a result, the D term (=|L-R|) in the process of FIG. 4 is likely to be larger than the set threshold factor X (i.e., D>X), and the process in FIG. 4 will result in an indication that only one fiber is "live".

2. In a case where only one fiber is live and the other fiber is "dark", the process in FIG. 4 will always show the correct direction of signal traffic. That is, D>X is easily met since leakage from either fiber is difficult to obtain in the first instance, and the amount of light that is leaked and received by the detector associated with the direction of the live signal will far exceed the light (if any) incident on the other detector.

3. In a case where both fibers are dark, it is apparent that the process in FIG. 4 will allow the tool 9 to determine and indicate the "no signal" condition correctly.

Therefore, only scenario 1 above can be a problem if the threshold factor X is set too small.

Factor X Set Too Large

If, however, the factor X is set too large, e.g., 10 dB or higher, the following can occur:

1. In the case where both fibers are live with signals in both directions, the tool 9 will produce consistent results since no condition can result where D>X. As seen in the process of FIG. 4, the tool will always properly indicate the presence of signal traffic in both directions.

2. In the case where one fiber is live and the other fiber is dark, the tool 9 may not be able to produce consistent results.

That is, signal leakage from the live fiber will reach the photo detector associated with the direction of the signal. A relatively small amount of the leaked signal is also likely to reach and to be sensed by the other photo detector, however. Thus, there is a possibility that the condition D<X in the process of FIG. 4 will be met, and that the tool will falsely indicate that signals are present in both directions of traffic along the cable.

3. In the case where both fibers are dark, it can be seen that the process in FIG. 4 will enable the tool 9 to indicate a "no signal" condition correctly.

Therefore, only scenario 2 above may be a problem if the factor X is set too high.

Factor X Set at Proper Value

If the factor X is set at a proper value, e.g., between 4 and 5, then the following is likely to occur:

1. In the case where both fibers have "live" signals, the tool 9 will produce consistent results, since the condition D<X can be kept most of the time, the tool will correctly indicate signal traffic for both directions.

2. In the case where one fiber is live and one fiber is dark, the tool 9 will produce consistent results, since the condition D>X can be maintained most of the time. The tool will therefore indicate the presence of one-way traffic in the correct direction.

3. In the case where both fibers are dark, the flow chart of FIG. 4 shows that the tool 9 will readily indicate a "no signal" condition correctly.

Therefore, the tool 9 is least likely to produce false indications once the threshold factor X is set properly for the bend insensitive dual fiber cable of this example.

EXAMPLE TWO

A Round Non-Bend Insensitive Dual Fiber Cable With Kevlar Material

When clamping cables containing dual non-bend insensitive fibers with the tool 9, light signal leakage is produced more readily than in cables having bend insensitive fibers. Therefore, the value of the threshold factor X should be set to a relatively small value, e.g., about one dB, as explained below.

Factor X Properly Set (small value)

If the threshold factor X is set to a small value, say one dB, the following scenarios are likely to occur:

1. In a case wherein both fibers are "live" with signal traffic, the tool 9 will produce consistent results because both fibers are non-bend insensitive (i.e., easily capable of signal leakage). As a result, the term D (=|L-R|) in the process of FIG. 4 will easily meet the condition D<X, with the result that the tool 9 will properly indicate that the fibers are passing signal traffic in both directions.

2. In a case wherein one fiber is live and the other fiber is dark, the tool 9 will readily indicate the correct direction of signal traffic since the condition the D>X in FIG. 4 is clearly met.

3. In a case wherein both fibers are dark, the process in FIG. 4 will correctly indicate the "no signal" condition.

Therefore, for all three scenarios above, the tool 9 will correctly indicate the directions of signal traffic flow (if any) along the cable.

Factor X Too Large

If the threshold factor X is set too high, e.g., greater than 4, then the following can happen:

1. In the case where both fibers are live with signal traffic, the tool 9 will produce consistent results since there is no condition that could cause D>X in FIG. 4. Therefore, the tool will properly indicate that both fibers are passing signal traffic in both directions.

2. In the case wherein one fiber is live and the other fiber is dark, the tool 9 may not obtain consistent results. Since the one fiber is bent, the light signal leakage from the fiber will illuminate the photo detector associated with the direction the signal is traveling in the fiber. But a smaller amount of the leaked light is also likely to reach and be measured by the opposite photo detector. Thus, there is a possibility that the condition D<X in FIG. 4 will be met. As a result, the tool 9 will falsely indicate that live signal traffic is present in both directions. Note that since the fibers are not bend insensitive, this problem may occur at relatively low settings of the threshold factor X.

3. In case where both fibers are dark, the process in FIG. 4 will correctly produce a "no signal" indication.

Therefore, the tool 9 is least likely to produce false indications, provided the threshold factor X is not set too large as in the second scenario immediately above.

Accordingly, by allowing the threshold factor X in the tool 9 to be adjustable or set by the user, the tool can accommodate all the above mentioned scenarios for different kinds of dual fiber optical cables, and always yield correct detection results. The tool 9 should therefore be of great help to persons who operate and maintain modern data centers where dual fiber optical cables are now being deployed.

While the foregoing represents preferred embodiments of the invention, it will be understood by persons skilled in the art that various changes, modifications, and additions can be made without departing from the spirit and scope of the present invention, and that the invention includes all such changes, modifications, and additions that lie within the scope of the following claims.

We claim:

1. An optical fiber identifier tool, comprising:
a housing including a head portion having a darkened recess, and a lever or trigger arranged on the housing for operation of the tool;
a slot or groove formed in the head portion of the tool for inserting a length of a cable that contains a pair of optical fibers;
the head portion of the tool is constructed and arranged to urge the cable into the recess in the head portion and to force the cable to bend when the trigger is operated, so that a fraction of a light signal traveling in a given one of the fibers leaks from the fiber and exits the cable bend;
a first and a second photo detector each mounted inside the head portion at determined locations so that one of the detectors receives more of the light that exits the cable bend than the other detector depending on the direction the light signal travels in the given fiber, and each detector produces an output corresponding to an amount of light received by the detector;
an indicator arranged to indicate the directions of light signals traveling in the fibers along the cable; and
one or more processing components coupled to the photo detectors and the indicator, wherein the processing components are configured to define a threshold factor corresponding to a difference between the outputs of the photo detectors, so that if a difference between the outputs of the detectors does not exceed the threshold factor, the indicator reports the presence of light signals traveling in the pair of optical fibers in opposite directions along the cable.

2. A tool according to claim 1, wherein the processing components are configured to define the threshold factor in response to an entry by a user of the tool.

3. A tool according to claim 2, wherein the processing components are configured to run a setup routine when the tool is powered on, and the threshold factor is entered by the user during the setup routine.

4. A tool according to claim 1, wherein each of the photo detectors has a sensitivity level of about −80 dBm.

5. A tool according to claim 1, wherein the processing components are configured to define the threshold factor to a value between zero and 10 dB.

6. A tool according to claim 1, wherein the processing components are configured so that if a measured difference between the outputs of the detectors exceeds the threshold factor, the indicator reports that a light signal is traveling along the cable in one of the fibers, and in a direction associated with the detector receiving the most light exiting the cable bend.

7. A tool according to claim 1, wherein the processing components are configured so that if the neither one of the first and the second photo detectors has an output representing an amount of light exiting the cable, the indicator reports that no light signal is traveling in either one of the optical fibers.

8. A method of detecting the direction of light signals traveling in a pair of optical fibers in a cable, comprising:

urging the cable into a darkened recess or chamber in a head portion of a live fiber identifier tool, thereby forcing the cable to bend a certain amount when a trigger on the tool is operated so that a fraction of a light signal traveling in a given one of the fibers leaks from the fiber and exits the cable bend;

mounting each of a first and a second photo detector at a determined location inside the head portion so that one of the detectors receives more of the light that exits the cable bend than the other detector depending on the direction of the signal in the given fiber, and producing an output at each detector corresponding to the amount of light received by the detector from the cable bend;

providing an indicator and arranging the indicator to indicate the direction of light signals traveling in the fibers along the cable;

coupling one or more processing components to the photo detectors and the indicator, and configuring the processing components to define a threshold factor corresponding to a difference between the outputs of the photo detectors; and if the difference between the outputs of the photo detectors does not exceed the threshold factor, indicating that light signals are traveling in the pair of optical fibers in opposite directions along the cable.

9. A method according to claim 8, including configuring the processing components to define the threshold factor according to an entry by a user of the tool.

10. A method according to claim 9, including configuring the processing components to run a setup routine when the tool is powered on, and entering the threshold factor by the user during the setup routine.

11. A method according to claim 8, including providing each of the photo detectors with a sensitivity level of about −80 dBm.

12. A method tool according to claim 8, including configuring the processing components to define the threshold factor at a value between zero and 10 dB.

13. A method according to claim 8, including configuring the processing components so that if the difference between the outputs of the detectors exceeds the threshold factor, the indicator reports that a light signal is traveling along the cable in one of the fibers and in a direction associated with the detector receiving the most light from the cable bend.

14. A method according to claim 8, including configuring the processing components so that if the neither one of the first and the second photo detectors has an output representing an amount of light from the cable bend, the indicator reports that no light signal is traveling in either one of the optical fibers.

* * * * *